United States Patent
Nicol et al.

(10) Patent No.: US 10,019,340 B2
(45) Date of Patent: Jul. 10, 2018

(54) ON-DEMAND PROFILING BASED ON EVENT STREAMING ARCHITECTURE

(71) Applicant: LinkedIn Corporation, Mountain View, CA (US)

(72) Inventors: John W. Nicol, San Jose, CA (US); Zhenyun Zhuang, Belmont, CA (US); Arman H. Boehm, Palo Alto, CA (US); Tao Feng, San Jose, CA (US); Haricharan K. Ramachandra, Fremont, CA (US); Badrinath K. Sridharan, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 15/076,234

(22) Filed: Mar. 21, 2016

(65) Prior Publication Data
US 2017/0270024 A1    Sep. 21, 2017

(51) Int. Cl.
G06F 11/36    (2006.01)
G06F 11/34    (2006.01)
G06F 11/30    (2006.01)

(52) U.S. Cl.
CPC .......... G06F 11/3612 (2013.01); G06F 11/34 (2013.01); *G06F 11/30* (2013.01); *G06F 11/3466* (2013.01)

(58) Field of Classification Search
CPC .................. G06F 11/3612; G06F 11/3466
See application file for complete search history.

(56) References Cited

U.S. PATENT DOCUMENTS

2011/0145795 A1* 6/2011 Khanapurkar ...... G06F 11/3414
  717/126
2011/0246826 A1* 10/2011 Hsieh .................. G06F 11/3476
  714/20

(Continued)

OTHER PUBLICATIONS

YourKit Java Profiler "The Industry Leader in .NET & Java Profiling" Downloaded from www.yourkit.com on Dec. 27, 2016. www.yourkit.com.

(Continued)

*Primary Examiner* — Jacob D Dascomb
(74) *Attorney, Agent, or Firm* — Park, Vaughan, Fleming & Dowler LLP

(57) ABSTRACT

A system, apparatus, and methods are provided for managing on-demand profiling of one or more instances of a software application executing on a plurality of machines within one or more data centers. During operation, the system executes the one or more instances of the software application on the plurality of machines. Next, the system publishes, to a command channel, a command message that comprises a profiling request, wherein the profiling request specifies a subset of the machines. The system then receives, via a data channel, one or more data messages from the subset of the machines, wherein the data messages comprise data gathered by the subset of the machines in response to receiving the command message. Next, the system then evaluates the performance of the software application by aggregating and processing the data messages. Responsive to detecting an anomaly in the performance, the system then executes one or more remedies.

20 Claims, 8 Drawing Sheets

(56) References Cited

U.S. PATENT DOCUMENTS

| | | | | |
|---|---|---|---|---|
| 2013/0290934 A1* | 10/2013 | Simon | ............... | G06F 11/3636 |
| | | | | 717/125 |
| 2016/0085399 A1* | 3/2016 | Jain | ....................... | H04L 41/22 |
| | | | | 715/738 |
| 2016/0124780 A1* | 5/2016 | Scheerer | ............... | G06F 9/546 |
| | | | | 719/328 |
| 2016/0371170 A1* | 12/2016 | Salunke | ............ | G06F 11/3612 |
| 2016/0378635 A1* | 12/2016 | Taylor | ............... | G06F 11/3409 |
| | | | | 702/186 |
| 2017/0177546 A1* | 6/2017 | Heinz | ................... | G06F 17/18 |

OTHER PUBLICATIONS

Nagios Infrastructure Manager "Nagios is the Industry Standard in IT Infrastructure Monitoring" Downloaded from www.nagios.org on Dec. 27, 2016. www.nagios.org.

Server Density: "80 Linux Monitoring Tools" Downloaded from blog.serverdensity.com on Dec. 27, 2016. blog.serverdensity.com/80-linux-monitoring-tools-know/.

\* cited by examiner

ON-DEMAND PROFILING BASED ON EVENT STREAMING ARCHITECTURE

BACKGROUND

Field

The disclosed embodiments relate to profiling a software process. More particularly, a system, apparatus, and methods are provided for profiling a software application that executes on one or a plurality of machines.

Related Art

To monitor the performance of a software process that is executing on a computer, the process and/or the underlying computing environment may be profiled. For example, if a developer notices that a software application is taking an overly large amount of resources on a machine, the developer may invoke one or more profiling/metric gathering tools on the software application to collect various metrics (e.g., memory usage, function calls) over a period of time, which may provide the developer insight into one or more characteristics of the application's execution.

In other cases, the execution of a software application on one or more production servers may be continually monitored for performance anomalies to minimize downtime and maintain quality of service. In this use case, technological limitations (e.g., network bandwidth limitations) and security requirements (e.g., enforced system privileges) may preclude remote collection of profiling data and other metrics from the production servers. Thus, one or more metric/profile-gathering tools may be locally installed on the production servers. However, because profiling tools may be expensive to run continuously, developers may be compelled to manually control the profiling tools so that metrics are gathered only at specific times for a subset of the production servers, which may result in (1) lost developer time and (2) less comprehensive profiling of the software application.

Hence, what is needed is a system that enables one to control metric/profile-gathering tools across one or more machines without the above-described problems.

BRIEF DESCRIPTION OF THE FIGURES

In the figures, like reference numerals refer to the same figure elements.

DETAILED DESCRIPTION

Figure 1:
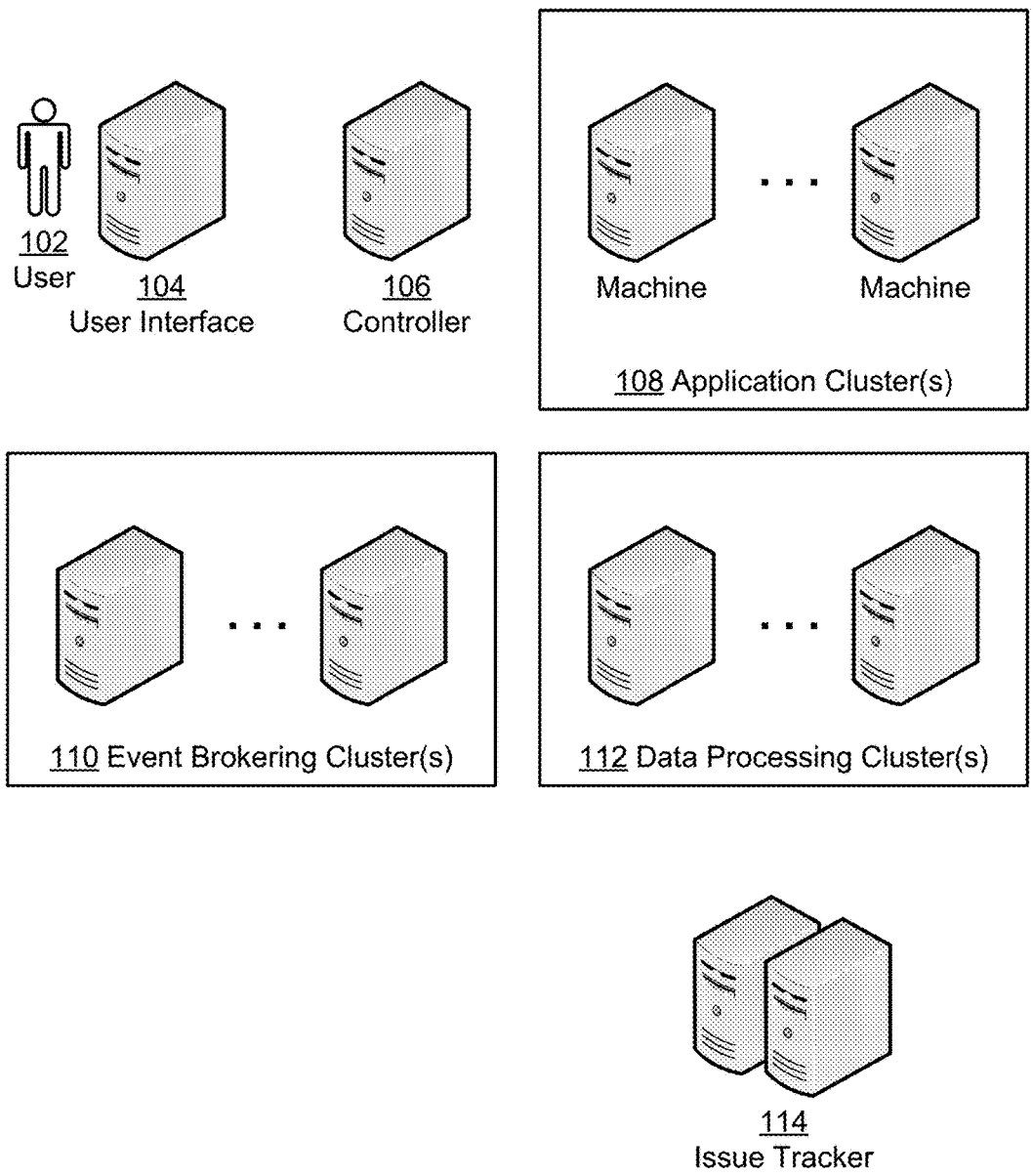
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, flash storage, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for profiling a software process. More specifically, the disclosed embodiments provide a method, apparatus, and system for managing on-demand collection of profile data and/or metrics of one or more instances of a software application executing on one or a plurality of machines within one or more data centers.

During operation, a message brokering cluster that serves as an event streaming architecture to one or more data centers maintains a command channel, on which command events (i.e., command messages) are published, and a data channel, on which data events (i.e., data messages) are published. Meanwhile, machines distributed among the data centers execute one or more instances of a software application. Each of the machines, which may be organized into one or more application clusters, subscribes to the command channel to listen for command messages. In addition, a data processing cluster subscribes to the data channel to listen for data messages.

Next, a developer interacts with a user interface provided by a client application to generate a profiling request, which the client application forwards to a controller. The profiling request specifies a number of parameters, which may include (1) which machines and/or application clusters to perform profiling on, (2) which profiler to invoke, and (3) a time duration for which profiling data is to be obtained. The controller then publishes to the command channel a command message that encapsulates the profiling request. Each machine that receives the command message determines whether the machine is specified by the profiling request. If the machine is not specified by the profiling request, the machine ignores the command message. Otherwise, the machine invokes the specified profiler for the specified duration and publishes to the data channel one or more data messages that encapsulate profiling data.

Data messages are received by the data processing cluster, which aggregates profiling data from the data messages and processes the profiling data to obtain insight into the performance of the software application. If the data processing cluster detects one or more anomalies in the software application's performance, one or more actions may be taken to remedy the anomalies.

Some embodiments may correspond to a profiling infrastructure that provides near real-time profiling with low overhead. Rather than require developers to manually control profiling tools at each individual machine, some embodiments provide both a centralized application programming interface (API) and a controller that enable developers to remotely deploy, configure, and undeploy profiling tools on-demand at one or more machines across one or more data centers.

Some embodiments may include anomaly detection systems to assist with regression testing, application optimization, and/or investigations into performance issues. When an issue occurs with a software application in production, developers can send commands to the problematic machines and/or retrieve historical data using a graphical user interface (GUI) and/or a command-line interface (CLI). The commands specify (1) which machines and/or application clusters to perform profiling on, (2) which profiler to invoke, and (3) a time duration for which profiling data is to be obtained. The profiling data generated in response to the commands are sent to various data channels. The developers may process and visualize the profiling data in order to determine the issue's root cause.

In some embodiments, when a new version of the software application is deployed, it can initially be installed into an application cluster used for testing (i.e., a test cluster). When load is put on the test cluster, profiling and monitoring can be done in an on-demand fashion. During testing, the developer/tester can specify the machines and the profiling duration to the profiling tools. The profiled data can be processed and viewed to identify regressions and performance improvements.

In some embodiments, when a software application needs optimization, the software application can be installed and profiled on particular machines. Profiled data can then be used to identify the performance bottlenecks for further improvements, FIG. 1 shows a schematic of a system in accordance with the disclosed embodiments. As shown in FIG. 1, system 100 corresponds to one or more data centers associated with a software application and includes different components in different embodiments. In the illustrated embodiments, the system includes user 102, user interface 104, controller 106, application cluster(s) 108, event brokering cluster(s) 110, data processing cluster(s) 112, and issue tracker 114.

The data centers may each house one or more machines (i.e., servers, computers) on which one or more instances of the software application are executed. The machines may be organized into one or more clusters of machines, such as application cluster(s) 108. In some embodiments, the total number of machines may number in the thousands, with each data center having many clusters and each cluster having many machines.

In general, a cluster of machines may share common properties. For instance, each of the machines in an application cluster may execute one or more instances of the software application. In some embodiments, a physical machine may execute one or more instances of the software application within one or more containers and/or virtual machines, wherein each container and virtual machine provides a virtualized operating-system-level environment.

A machine in an application cluster may include one or more profiling programs (i.e., profilers) installed for profiling the execution of the instance of the software application executing on the machine. Examples of profilers may include Java profilers (Java™ is a registered trademark of Oracle America, Inc.) for profiling applications written to execute in a Java Virtual Machine (JVM), C++/C profilers, Python profilers, profilers for the .NET Framework, one or more profilers for other programming languages, and one or more system-level profilers. These profilers may profile CPU and memory usage of the software application instance on the machine. Because a profiler may consume significant CPU and memory overhead, the profilers may be undeployed until a profiling request is received.

A machine in an application cluster may include one or more processes (i.e., system metrics collectors) installed for collecting and storing metrics (i.e., samples) associated with the performance of one or more operating-system-level environments provided by the machine and/or one or more containers within the machine. Examples of these processes may include the processes top and ps. Stored metrics may correspond to CPU usage, memory usage, network input/output (I/O), and disk usage of the machine and/or a container. In some embodiments, processes associated with collecting system metrics may continuously run and store metrics within the machine's file system prior to receiving a profiling request.

A machine in an application cluster may include a process for listening on the command channel, receiving command messages, and invoking profilers in response to a command message. The machine may also include a process for constructing and publishing data messages to the data channel.

As shown in FIG. 1, user 102 (e.g., a developer) interacts with user interface 104, which is provided by a client program that executes on a computer, to send a profile request to application cluster(s) 108. The profile request is sent via controller 106 (which runs in an arbitrary location), which encapsulates the profile request in a command message and publishes the command message to the command channel.

The command channel, the data channel, and other channels may be maintained by event brokering cluster(s) 110. Event brokering cluster(s) 110 may correspond to one or more machines that provide an event streaming architecture for application cluster(s) 108. In some embodiments, event brokering cluster(s) 110 may run Apache Kafka, which is an event streaming transformation system that can be scaled to support high volumes of data. A data center may include one or more Kafka clusters, and each Kafka cluster maintains one or more channels (i.e., Kafka topics), wherein a channel may correspond to a schema.

A process (i.e., a producer) may publish (i.e., produce or post) a message (i.e., an event) to a channel as long as the message follows the corresponding schema's format. Here, the process may consult a schema registry during the process of producing a message for the channel. Another process (i.e., a subscriber) may listen (i.e., subscribe) to a channel for messages. When a message is published onto a channel, the Kafka cluster ensures that the message conforms to the channel's schema. If the message conforms to the schema, the Kafka cluster forwards the message to all subscribers of the channel. Once a subscribing process receives the message, the subscriber may consume the data encapsulated by the message. Messages may be written in various formats including Javascript Object Notation (JSON) and Avro. In some cases, a channel may have thousands of producers and/or thousands of subscribers.

Using Kafka with well-defined schemas allows one or more types of command messages and data messages to be sent. Given the diversity of applications and programming languages, the different requirements for command-transfer and data-transfer, the one or more ways of issuing commands and the one or more ways to present and analyze the data, it is desirable to have a unified communication architecture to support both command and data payloads, one or more types of profiling, one or more ways of issuing commands, one or more ways of presentation, and different types of integration.

Due to its high scalability, a Kafka cluster can support large amounts of data from thousands of machines. A large amount of profiled data may impose high pressure on communication channels and/or networks. Thus, it may be advantageous to rely on a highly scalable transmission platform such as Kafka.

In the illustrated embodiments, event brokering cluster(s) 110 maintain the command channel and the data channel. Controller 106 publishes command messages for the command channel, and machines within application cluster(s) 108 subscribe to the command channel to receive the command messages. Also, the machines within application cluster(s) 108 publish data messages for the data channel, while components of data processing cluster(s) 112 subscribe to the data channel to receive the data messages.

Data processing (i.e., computational) cluster(s) 112 support the distributed processing of data, especially very large data sets. In some embodiments, data processing cluster(s) 112 may include a Hadoop cluster. Additionally, the very large data sets may correspond to profiling data aggregated from one or more data messages received from the data channel. Data processing cluster(s) 112 may also integrate additional processing and/or analysis components that implement additional stages of processing on the profiling data.

Jobs (e.g., Hadoop jobs) submitted to the data processing cluster are divided and/or partitioned into any number of tasks, which are distributed among the data nodes for processing. When executed, a job may spawn one or more mapper tasks that process (raw) data, and (oftentimes) a set of reducer tasks that process the output of the mapper tasks. Each task may be executed within a container that provides a virtualized environment (e.g., such as a JVM), in which instructions (e.g., high level code, bytecode, native machine code) contained in the job may execute.

Issue tracker 114 may correspond to project management software that uses tickets to track issues and/or bugs (e.g., JIRA). In some embodiments, data processing cluster(s) 112 may open tickets at the issue tracker in response to detecting an anomaly in the software application's performance.

Figure 2:
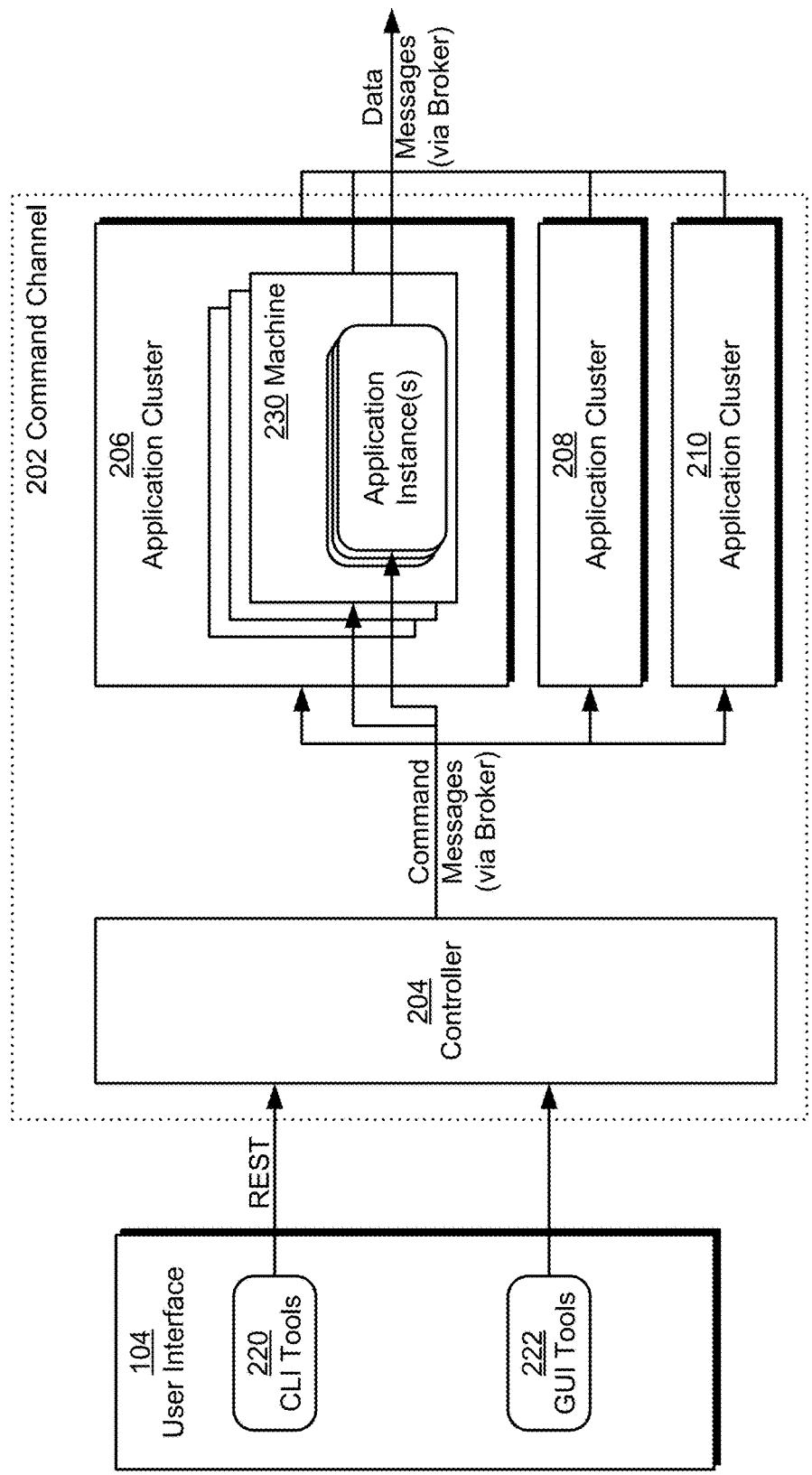
FIG. 2 shows a system for managing on-demand profiling of one or more instances of a software application in accordance with the disclosed embodiments.

FIG. 2 shows a system for managing on-demand profiling of one or more instances of a software application in accordance with the disclosed embodiments. More specifically, FIG. 2 shows a controller publishing command messages to a command channel, such as command channel 202. As shown in FIG. 2, the system includes a user interface 104, command channel 202, a controller 204, and application clusters 206-210. Each of these components is described in further detail below.

Command channel 202, which is maintained by event brokering cluster(s) 110 (of system 100, depicted in FIG. 1), is used to forward profiling requests from user interface 104 to one or a plurality of machines (e.g., machine 230) within application clusters 206-210.

A user interacts with user interface 104 to produce a profiling request. The user interface may provide CLI tools for use, such as CLI tools 220. The user interface may also, or instead, provide GUI tools such as GUI tools 222 (e.g., a web application used via a browser or a desktop application).

For example, the user may fill various forms and click various buttons to customize a profiling request and send the request via the user interface. In some embodiments, in customizing the profiling request, the user may specify which cluster, machines, and/or containers the profiling request is directed to by specifying hostnames, domain names, internet protocol (IP) addresses, subnets, and/or other information that may identify the recipient(s) (e.g., cluster ID, machine ID, container ID). The user may also specify (1) which profilers to turn on (e.g., JVM profiler, C/C++ profiler, Python profiler, and/or system metrics including CPU, memory, and network usage), (2) a time duration (e.g., minutes, hours, days, and/or months) for which profiling data is to be obtained, which may include a start time and an end time, (3) a maximum number of samples (e.g., 25 samples per data message) to include in each data message to limit the size of data messages sent out by machines, (4) a time period (e.g., 5 seconds) that a machine should wait between taking samples (i.e., a sampling interval) to limit the data flow rate over the data channel, and/or (5) a process on which to perform profiling (e.g., a process name or a process ID).

For reasons of security and/or because application clusters 206-210 may reside in different geographic locations, user interface 104 may not have direct access to command channel 202. Instead, controller 204, which may correspond to a remote application programming interface (API) served by one or more machines, may serve as a proxy between user interface 104 and command channel 202. Once the user submits the profiling request, user interface 104 communicates the profile request to the controller over the network. In some embodiments, controller 204 may provide a representational state transfer (REST) API thereby allowing user interface 104 to communicate the parameters of the profiling request to the controller via a RESTful request.

In some embodiments, to prevent the forwarding of profiling requests from unauthorized sources, the profiling request is cryptographically signed by the user interface and the signature is verified by the controller. The profile request may include an identity of the user (e.g., a lightweight directory access protocol (LDAP) user ID) that created the profile request. Only certain users may be permitted to make profiling requests. Thus, making a profiling request may require authentication at the user interface and the controller. Additionally, to avoid potential hacks, profiling requests may be securely hashed to guarantee their provenance. Furthermore, timestamps of each profiling requests may be verified to avoid replay attacks.

When a profiling request is received, controller 204 may extract the parameters from the profiling request and build a command message from the parameters before publishing the command message to the command channel. The command message is constructed to conform to the command channel's schema and may be formatted in JSON. In some embodiments, the command message may use an enum to specify which profiler to turn on (e.g., CPU profiling corresponds to 1, memory profiling corresponds to 2, and JVM profiling corresponds to 3). Because different types of profiling may be controlled by different parameters, the structure of a command message may vary depending on the enum selected. For example, if a profiling request specifies system-level profiling (e.g., CPU usage, memory usage, and/or network usage), the profiling request does not specify a process to perform sampling on.

Once published, the command message is forwarded by event brokering cluster(s) 110 to all subscribers of command channel 202. While each machine (e.g., machine 230) within application clusters 206-210 may receive the command message, only clusters, machines, and/or containers specified by the command message respond to the command message. Other recipients may ignore the command message. Any machine and/or container that is specified by the command message may (1) boot up one or more instances of the software application, (2) execute one or more profiling actions specified by the command message, and (3) forward profiling data to data processing cluster(s) 112 by publishing one or more data messages via the data channel (e.g., data channel 402 as shown below in FIG. 4).

In some embodiments, to protect against command messages from unauthorized sources, the command message is cryptographically signed (i.e., provided a cryptographic hash) by the controller and the signature is verified by recipients of the message. Furthermore, timestamps of each message may be verified to avoid replay attacks.

Figure 3:
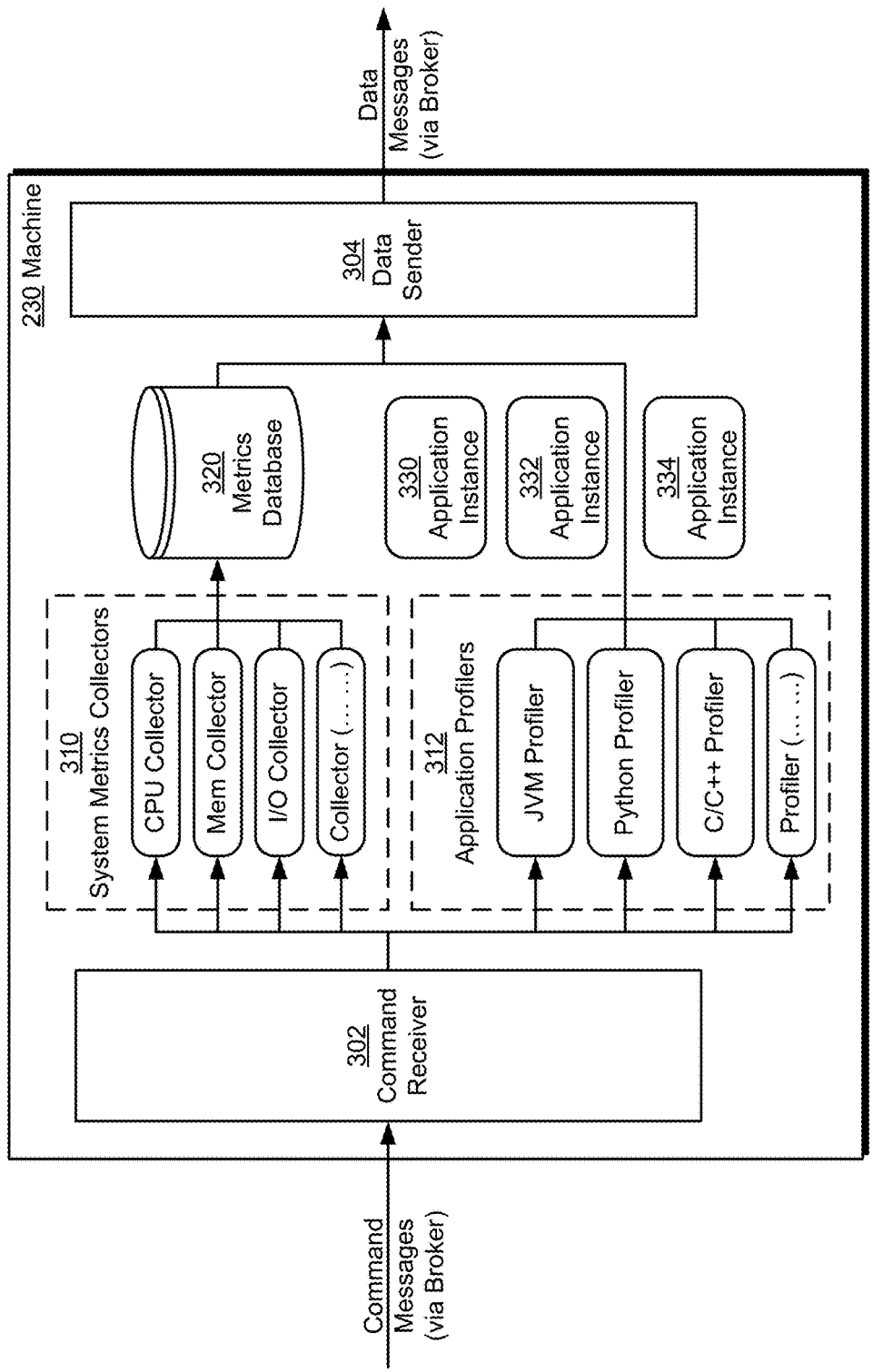
FIG. 3 shows a system for managing on-demand profiling of one or more instances of a software application in accordance with the disclosed embodiments.

FIG. 3 shows a system for managing on-demand profiling of one or more instances of a software application in accordance with the disclosed embodiments. More specifically, FIG. 3 shows a machine within an application cluster, such as machine 230, responding to a command message. As shown in FIG. 3, machine 230 includes command receiver 302, application profilers 312, system metrics collectors 310, and data sender 304. Each of these components is described in further detail below.

Machine 230 may correspond to one of the physical servers executing one or more instances of the software application within application cluster(s) 108. Alternatively, machine 230 may correspond to a virtual server or a container that is provided by a virtualization/container framework such as VMWare, Kernel-based Virtual Machine (KVM), Docker, and/or Linux Containers (LXC). The operating system-level environment provided by machine 230 may support various processes including software application instances 330-334, command receiver 302, and/or data sender 304. Application profilers 312 may correspond to various profilers installed in machine 230 for profiling application instances 330-334. For example, if the software application is written in Java, machine 230 may include a JVM profiler.

In some embodiments, to conserve resources, one or more profilers may not be deployed and/or application instances 330-334 may not execute before receiving a command message. System metrics collectors 310 may correspond to various processes installed in machine 230 for collecting system metrics (e.g., top and/or ps). Unlike profilers, certain system metrics collectors may not require much overhead and may continuously execute prior to the receipt of a command message. Samples collected by these processes may be stored within the machine's file system, such as in metrics database 320 (e.g., a flat file, a binary file, an RDBMS database). Samples stored within the database may later be retrieved in response to a command message.

Command receiver 302 subscribes to command channel 202 for command messages. In some embodiments, the command receiver may be a background process (i.e., a daemon) that listens on a port associated with the command channel. In some embodiments, the command receiver may be referred to as an "on-demand profiler."

Data sender 304 obtains profiling data from application profilers 312 and/or system metrics collectors 310 and forwards the data to data processing cluster(s) 112 by publishing one or more data messages, which encapsulate profiling data, to the data channel. The data sender may be a separate process from command receiver 302. Alternatively, the functions of command receiver 302 and data sender 304 may be performed by the same process.

When a command message is received by the command receiver, the command receiver determines whether the command message specifies machine 230. If not, the command receiver ignores the message. If the command message specifies machine 230, the command receiver may interact with application profilers 312 and/or system metrics collectors 310 depending on the command's parameters.

If the command message requests the profiling of the software application, the command receiver may invoke application instances 330-334 if the instances are not executing. Next, the command receiver invokes one or more profilers specified by the command to attach to and monitor the execution of the application instances. The rate at which samples are gathered by a profiler may be limited by a sampling interval specified by the command message. For example, if the command message specifies a sampling interval of 100 milliseconds (ms), the profiler may collect data once every 100 ms. Depending on the profiling duration specified by the command message, the command receiver may schedule the application instances and/or the profilers to deploy at a future time and undeploy sometime after the execution start time. For example, if the command message received at 9:00 AM requests the JVM profiler to monitor application instance 330 from 1:00 PM to 3:30 PM on the same day, command receiver 302 may schedule the JVM profiler to deploy four hours later and undeploy six and a half hours later.

In embodiments where a profiler corresponds to an independent process and/or script, deploying the profiler may correspond to executing the profiler, while undeploying the profiler may correspond to halting the execution of the profiler. In other embodiments, deploying a profiler may correspond to restarting one or more application instances within the machine with a different set of execution options, modules, and/or plugins enabled.

Profiling data and/or samples obtained while a profiler is deployed may be passed (e.g., via the machine's memory and/or the file system) to data sender 304. Data sender 304 collates the profile data, encapsulates the profile data within one or more data messages, and publishes the data messages to the data channel. In some embodiments, the size of a data message is limited by a maximum number of samples per message specified by the command message.

If the command message requests system metrics, the command receiver may cause data sender 304 to access metrics database 320 to obtain system metrics that correspond to the time period specified by the command message.

Data sender 304 then collates the metrics, generates one or more data messages containing the system metrics, and publishes the one or more data messages, wherein the size of each data message may be limited by the maximum number of samples per message specified by the command message.

In some embodiments, to further save overhead, one or more of the system metrics collectors may not execute until a command message requests system metrics, wherein the command receiver starts and stops the system metrics collectors according to the profiling duration specified by the command.

In some embodiments, a command message may also cause command receiver 302 to stop one or more deployed profilers within machine 230 if the profiling request specifies an end to the profiling at the machine. The command receiver may additionally end application instances 330-334 to save additional overhead.

Figure 4:
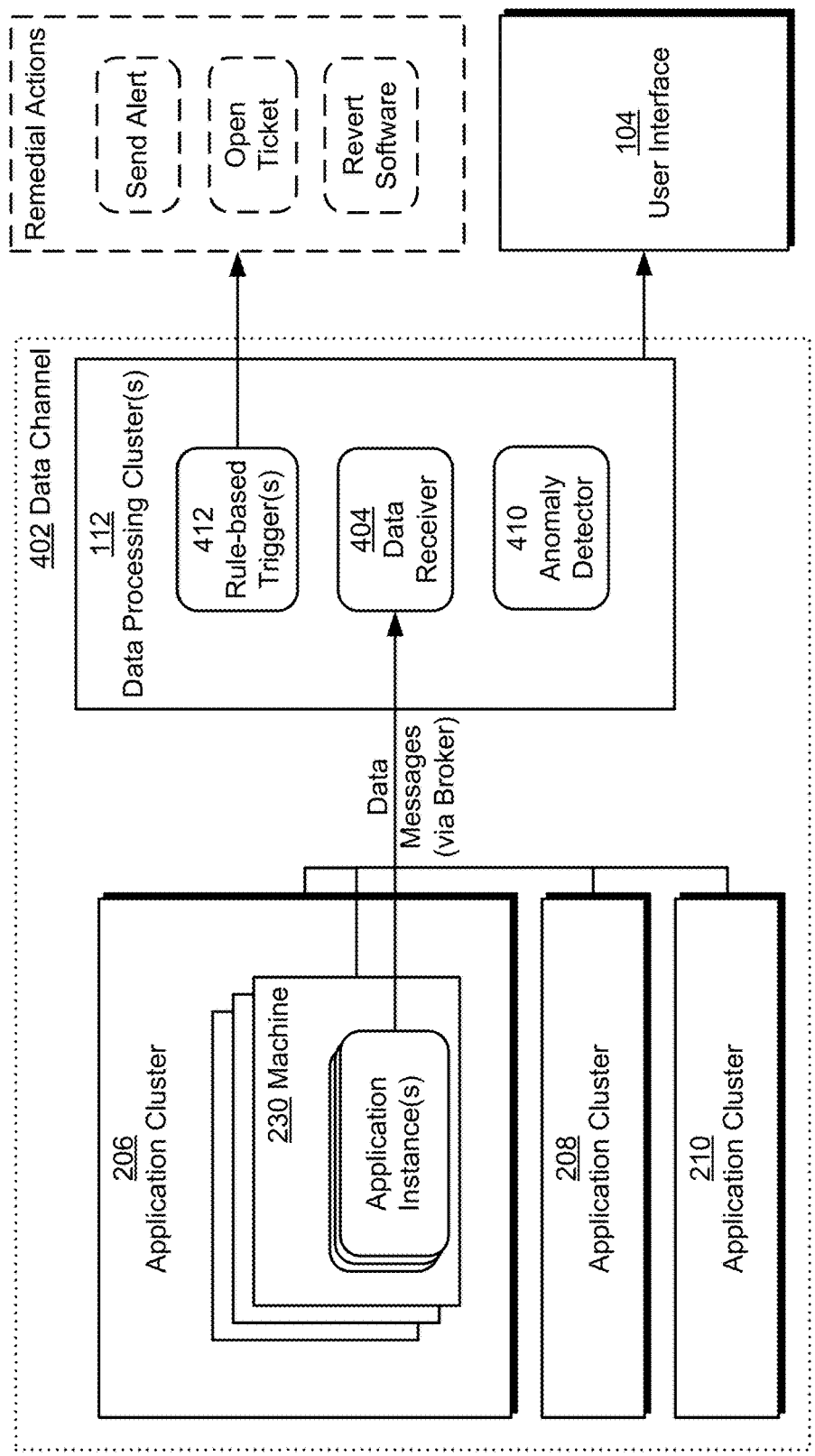
FIG. 4 shows a system for managing on-demand profiling of one or more instances of a software application in accordance with the disclosed embodiments.

FIG. 4 shows a system for managing on-demand profiling of one or more instances of a software application in accordance with the disclosed embodiments. More specifically, FIG. 4 shows application clusters sending data messages to the data processing cluster. As shown in FIG. 4, the system includes application clusters 206-210, data channel 402, data processing cluster(s) 112, and user interface 104. Each of these components is described in further detail below.

Data channel 402, which is maintained by event brokering cluster(s) 110 (of system 100, shown in FIG. 1), is used to forward profiling data collected from one or a plurality of profilers and/or system metrics collectors running within application clusters 206-210 to data processing cluster(s) 112 for aggregation and processing. Data messages published to the data channel are constructed to conform to the data channel's schema and may be formatted in JSON. In particular, profiling data encapsulated within the data messages may include timestamps, stack traces, and/or performance data, wherein each piece of data is associated with a particular thread ID (for application instances that are multithreaded).

Data processing cluster(s) 112 may include data receiver 404, which may execute on one or more machines within the cluster. In some embodiments, data receiver 404 may be external to the data processing cluster(s). Data receiver 404 may be a background process subscribing to data channel 402 for data messages by listening on a port associated with the data channel.

When a data message is received by the data receiver, the data receiver extracts the profiling data from the data message and aggregates it with profiling data previously collated from earlier data messages. The aggregated profiling data may then be processed within the data processing cluster(s) via one or more Hadoop jobs. The processed data may then be used to evaluate the performance of the software application as described below.

In some embodiments, data processing cluster(s) 112 may include functionality for using the processed data to detect anomalies within the performance of the software application (e.g., anomaly detector 410). For example, anomaly detector 410 may analyze current data and past data to determine whether there has been a drop in the software application's performance over time. In another example, the anomaly detector may analyze the processed data to identify "hot" methods that ought to be optimized. Other anomalies that may be detected include CPU usage exceeding a particular threshold (i.e., CPU usage spikes), memory usage exceeding a particular threshold (i.e., memory usage spikes), network and/or I/O usage exceeding a particular threshold, and hanging/deadlocked threads. Developers and/or users of the software application may then use information pertaining to the detected anomalies to maintain and/or improve the application's performance and/or stability.

In some embodiments, data processing cluster(s) 112 may include functionality for automatically taking action in response to processed data fulfilling a condition and/or rule (e.g., rule-based triggers 412). For example, if the processed data indicates that the software application's performance is worse than a particular threshold, actions automatically taken by the system may include (1) sending one or more notifications (e.g., emails, text messages) to developers and/or users of the application, (2) opening one or more tickets at issue tracker 114, (3) automatically reverting (i.e., rolling back) installations of the software application on one or more of the machines to an earlier version of the software application, (4) restarting one or more instances of the software application, and (5) restarting one or more machines within application clusters 206-210. Detected anomalies may serve as triggers (e.g., sending an email in response to detecting a CPU usage spike).

In some embodiments, the processed data may be forwarded to user interface 104 and/or other client applications for display to the user. In particular, data processing cluster(s) 112 may apply one or more transformations to the profiling data to facilitate its display to the user via a GUI and/or the CLI in response to user queries. In some embodiments, the profiling data may be converted to a compressed binary format (e.g., hprof format) and/or an image format (e.g., PNG, JPEG) for visualization.

Figure 5:
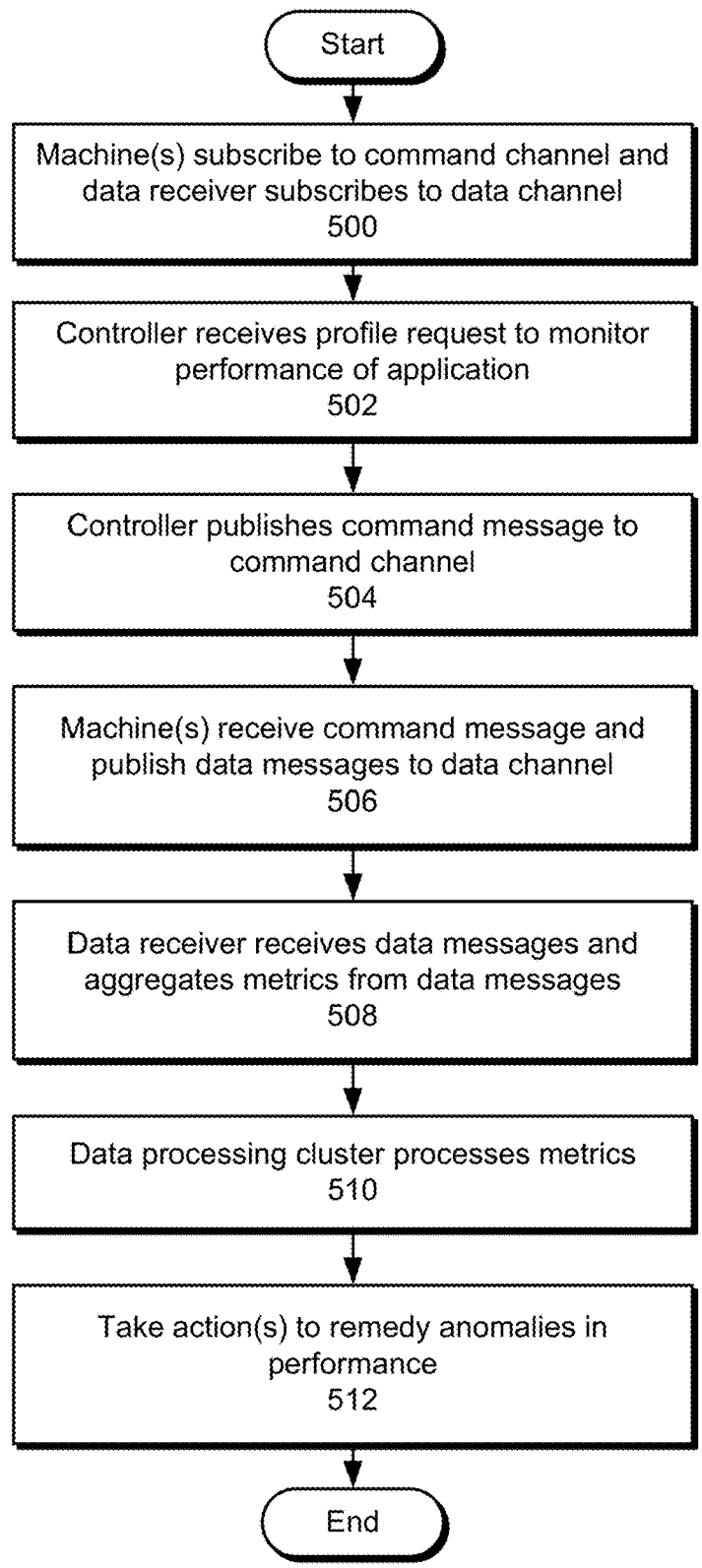
FIG. 5 shows a flowchart illustrating an exemplary process of using a message broker to manage the profiling of one or a plurality of machines in accordance with the disclosed embodiments.

FIG. 5 shows a flowchart illustrating an exemplary process of using a message broker to manage the profiling of one or a plurality of machines in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, one or a plurality of machines, which are members of one or more application clusters for executing a software application, subscribe to a command channel, while the data receiver of a data processing cluster subscribes to a data channel, wherein both the command and data channels are maintained by an event brokerage cluster (operation 500). A controller, which serves as a proxy between a user interface and the application clusters, receives a profile request to monitor the performance of the software application from a user that interacts with the user interface (operation 502).

The controller then builds a command message from parameters found within the profiling request and publishes the command message to the command channel (operation 504). Next, each of the machines that subscribe to the command channel receives the command message and, in response to the receipt of the command message: (1) gathers profiling data and (2) publishes one or more data messages containing the profiling data to the data channel (operation 506).

The data receiver receives the data messages from the application clusters, extracts the profiling data from the data messages, and aggregates the profiling data (operation 508). Once the data processing cluster receives the aggregated profiling data from the data receiver, the data processing cluster processes the profiling data (operation 510). Next, the data processing cluster may use the processed data to detect one or more anomalies within the performance of the software application. Here, the detection of one or more anomalies may trigger one or more automatic actions that are taken to address and/or remedy the anomalies (operation 512).

Figure 6:
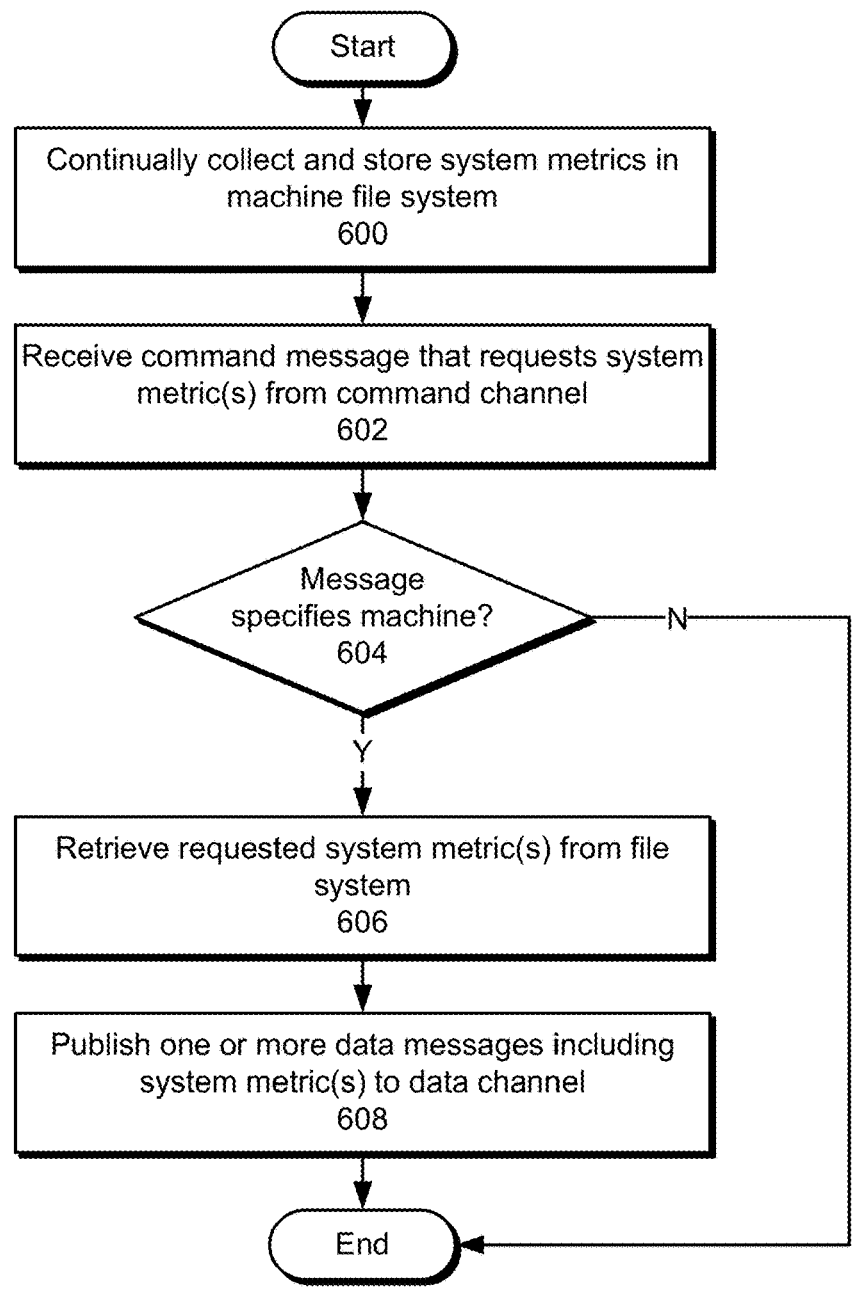
FIG. 6 shows a flowchart illustrating an exemplary process of a machine responding to a request for system metrics in accordance with the disclosed embodiments.

FIG. 6 shows a flowchart illustrating an exemplary process of a machine responding to a request for system metrics in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Prior to the reception of a command message by a machine, one or more system metrics collectors may be executing on the machine, continually collecting and storing system metrics in the machine's file system (operation 600). When the machine receives a command message that requests system metrics from the command channel (operation 602), the machine determines whether the message specifies the machine (decision 604). If the message does not specify the machine, the machine ignores the message. If the message specifies the machine, the machine retrieves the system metrics requested by the command message (operation 606).

It should be noted that if the command message specifies system metrics for a time period (i.e., a profiling duration) that has already elapsed, the machine may retrieve system metrics that were previously stored in the file system. If the command message specifies system metrics for a time period that has not fully elapsed, the machine may delay the retrieval of system metrics from the file system until the time period has fully elapsed. Next, the machine builds one or more data messages, each containing the system metrics and publishes the data messages to the data channel (operation 608).

Figure 7:
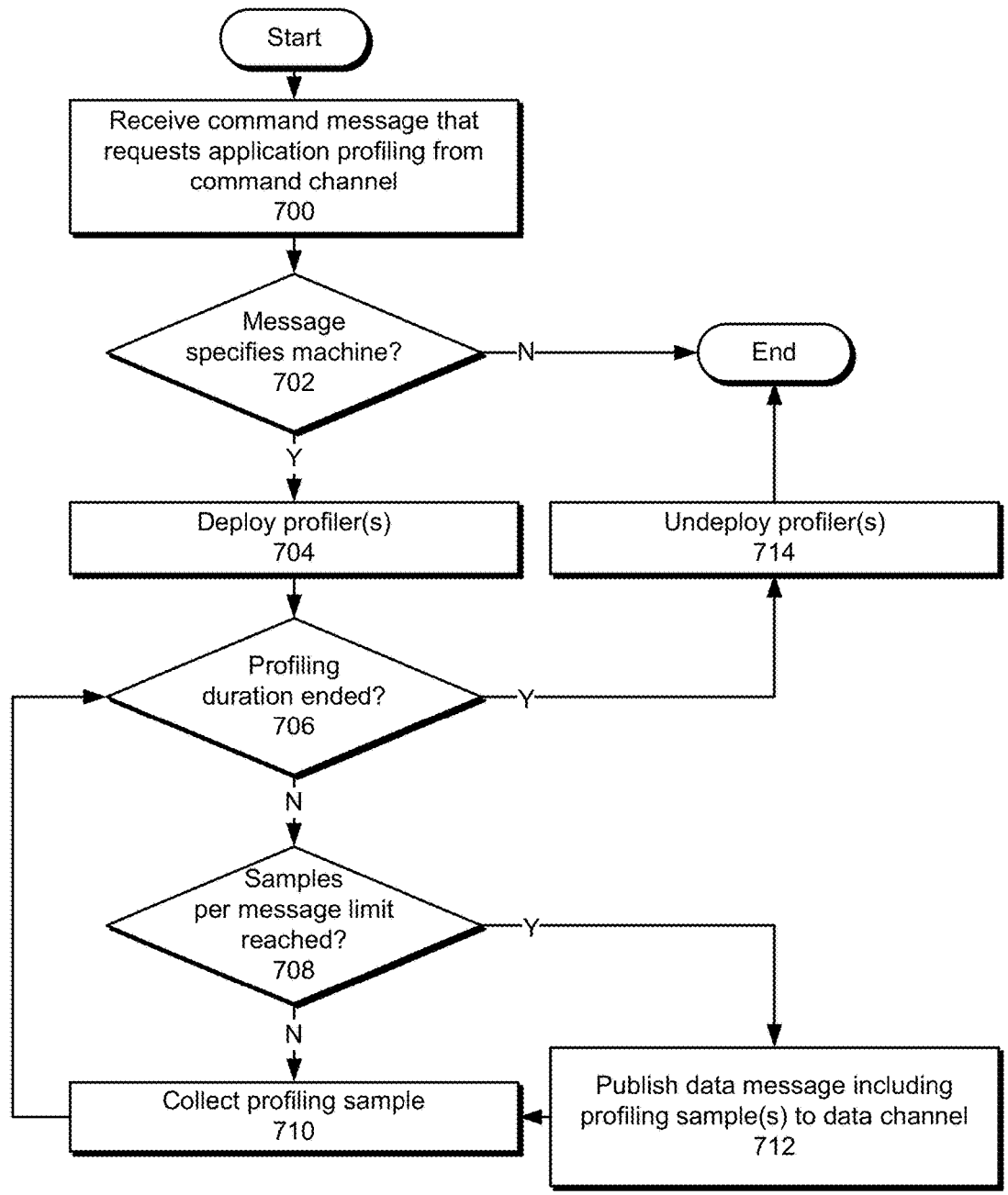
FIG. 7 shows a flowchart illustrating an exemplary process of a machine responding to a request for profiling an application in accordance with the disclosed embodiments.

FIG. 7 shows a flowchart illustrating an exemplary process of a machine responding to a request for profiling an application in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

When a machine receives a command message that requests application profiling from the command channel (operation 700), the machine determines whether the message specifies the machine (decision 702). If the message does not specify the machine, the machine ignores the message. If the message specifies the machine, the machine deploys one or more specified profilers at the specified profiling start time to profile the one or more instances of the software application executing in the machine (operation 704).

After collecting a profiling sample (operation 710), the machine waits for a profiling interval specified by the command message. At the end of the profiling interval, the machine determines whether a profiling end time specified by the command message has passed (decision 706). If the profiling end time has passed, the machine may publish one or more final data messages for the profiling session and then undeploys the profilers (operation 714). If the profiling end time has not passed, the machine determines whether a number of samples equal to a specified maximum number of samples per data message have been collected (decision 708). If so, the machine publishes a data message including the profiling samples to the data channel (operation 712) before collecting another profiling sample (operation 710).

Figure 8:
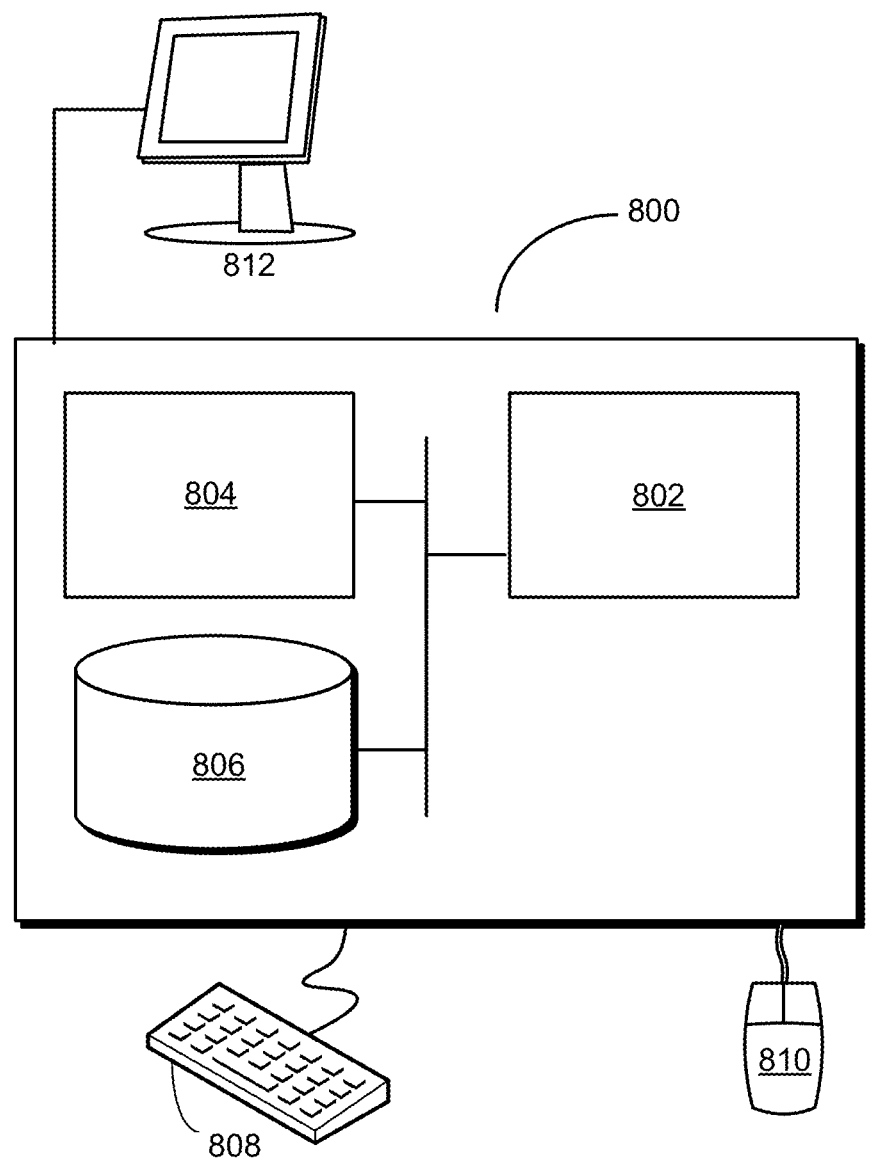
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for managing on-demand profiling of one or more instances of a software application executing on one or a plurality of machines within one or more data centers. The system may include an application apparatus that may execute the one or more instances of the software application on the machines. The system may include a controller apparatus that may receive a profiling request from a user of the system that specifies a subset of the machines. The controller apparatus may then publish, to a command channel, a command message that comprises the profiling request.

The system may include a data processing apparatus that may receive, via a data channel, one or more data messages from the subset of the machines, wherein the data messages include data gathered by the subset of the machines in response to receiving the command message. Next, the data processing apparatus may evaluate the performance of the software application by aggregating and processing the data messages. Responsive to detecting an anomaly in the performance, the data processing apparatus may then execute one or more remedies.

In addition, one or more components of computer system 800 may be remotely located and connected to the other components over a network. Portions of the present embodiments (e.g., application apparatus, controller apparatus, data processing apparatus, etc.) may also be located on different nodes of a distributed system that implements the embodiments. For example, the present embodiments may be implemented using a cloud computing system that manages the profiling of one or a plurality of machines that execute one or more instances of a software application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method, comprising:
executing one or more instances of a software application on a plurality of machines;
publishing, to a command channel, a command message that comprises a profiling request, wherein the profiling request specifies a subset of the machines, and wherein the profiling request specifies at least a type of profiler to invoke from a plurality of profilers installed on the plurality of machines;

at each machine that receives the command message, responsive to determining that the machine is included in the subset of the machines specified by the profiling request, responding to the profiling request by:

activating a profiler from the plurality of profilers, wherein the activated profiler corresponds to the specified type of profiler for an instance of the application that is executing on the machine at the beginning of a specified duration of time;

receiving, via a data channel, one or more data messages from the subset of the machines, wherein the data messages comprise data gathered by the subset of the machines in response to receiving the command message;

deactivating the profile at the end of the specified duration of time;

evaluating the performance of the software application by aggregating and processing the data messages; and responsive to detecting an anomaly in the performance, reverting the one or more instances of the application at the plurality of machines.

2. The method of claim 1, wherein:

the command channel corresponds to a first Kafka topic within a Kafka cluster and the data channel corresponds to a second Kafka topic within the Kafka cluster;

each command message conforms to a first schema associated with the first Kafka topic; and each data message conforms to a second schema associated with the second Kafka topic.

3. The method of claim 1, wherein the profiling request further specifies at least one of:

a type of metric;
a number of samples to include in each data message;
an interval of time to wait after gathering each sample; and
a duration of time over which to gather samples.

4. The method of claim 3, further comprising, at each machine that receives the command message:

responsive to determining that the machine is included within the subset of the machines specified by the profiling request, further responding to the profiling request by:

publishing one or more data messages to the data channel, wherein each of the data messages comprises one or more samples for the specified type of profiler; and responsive to determining that the machine is not included within the subset of the machines specified by the profiling request, ignoring the profiling request.

5. The method of claim 4, wherein:

the application executes on a Java Virtual Machine (JVM); and the profiler is a JVM profiler.

6. The method of claim 3, further comprising, at each machine that receives the command message:

responsive to determining that the machine is included within the subset of the machines specified by the profiling request, further responding to the profiling request by:

retrieving, from a file system of the machine, one or more samples that correspond to the type of metric and were previously collected; and publishing one or more data messages to the data channel, wherein each of the messages comprises a subset of the one or more samples; and responsive to determining that the machine is not included within the subset of the machines specified by the profiling request, ignoring the profiling request.

7. The method of claim 6, wherein the specified type of metric comprises at least one of:

a central processing unit (CPU) usage of the machine;
a memory usage of the machine;
a disk usage of the machine; and
a network usage of the machine.

8. The method of claim 1, wherein a detected anomaly comprises at least one of:

exceeding a central processing unit (CPU) usage threshold on at least one machine in the plurality of machines;

exceeding a memory usage threshold on at least one machine in the plurality of machines;

exceeding a network usage threshold on at least one machine in the plurality of machines; and a thread hanging on at least one machine in the plurality of machines.

9. The method of claim 1, further comprising, responsive to detecting the anomaly in the performance, causing one or more of:

sending an email to a developer of the software application; and opening a ticket at a bug tracking system.

10. The method of claim 1, wherein:

each subscriber to the command channel receives all command messages published to the command channel;

each subscriber to the data channel receives all data messages published to the data channel;

each machine in the plurality of machines subscribes to the command channel; and a Hadoop cluster subscribes to the data channel.

11. The method of claim 10, wherein the Hadoop cluster:

aggregates profiling data from the one or more data messages; and processes the profiling data.

12. The method of claim 1, wherein the command message and the one or more data messages are each formatted in one of:

JavaScript Object Notation; and
Avro.

13. An apparatus, comprising:

one or more processors; and memory storing instructions that, when executed by the one or more processors, cause the apparatus to:

execute one or more instances of a software application on a plurality of machines;

publish, to a command channel, a command message that comprises a profiling request, wherein the profiling request specifies a subset of the machines, and wherein the profiling request specifies at least a type of profiler to invoke from a plurality of profilers installed on the plurality of machines;

at each machine that receives the command message, responsive to determining that the machine is included in the subset of the machines specified by the profiling request, respond to the profiling request by:

activating a profiler from the plurality of profilers, wherein the activated profiler corresponds to the specified type of profiler for an instance of the application that is executing on the machine at the beginning of a specified duration of time;

receive, via a data channel, one or more data messages from the subset of the machines, wherein the data messages comprise data gathered by the subset of the machines in response to receiving the command message;

deactivate the profiler at the end of the specified duration of time;

evaluate the performance of the software application by aggregating and processing the data messages; and responsive to detecting an anomaly in the performance, revert the one or more instances of the application at the plurality of machines.

14. The apparatus of claim 13, wherein:

the command channel corresponds to a first Kafka topic within a Kafka cluster and the data channel corresponds to a second Kafka topic within the Kafka cluster;

each command message conforms to a first schema associated with the first Kafka topic; and each data message conforms to a second schema associated with the second Kafka topic.

15. The apparatus of claim 13, wherein the profiling request further specifies at least one of:

a type of metric;

a number of samples to include in each data message;

an interval of time to wait after gathering each sample; and a duration of time over which to gather samples.

16. The apparatus of claim 15, wherein the memory further stores instructions that, when executed by the one or more processors, cause the apparatus to:

responsive to determining that the machine is included within the subset of the machines specified by the profiling request, further respond to the profiling request by:

publishing one or more data messages to the data channel, wherein each of the data messages comprises one or more samples for the specified type of profiler; and responsive to determining that the machine is not included within the subset of the machines specified by the profiling request, ignore the profiling request.

17. The apparatus of claim 16, wherein:

the application executes on a Java Virtual Machine (JVM); and the profiler is a JVM profiler.

18. The apparatus of claim 15, wherein the memory further stores instructions that, when executed by the one or more processors, cause the apparatus to, at each machine that receives the command message:

responsive to determining that the machine is included within the subset of the machines specified by the profiling request, further respond to the profiling request by:

retrieving, from a file system of the machine, one or more samples that correspond to the type of metric and were previously collected; and publishing one or more data messages to the data channel, wherein each of the messages comprises a subset of the one or more samples; and responsive to determining that the machine is not included within the subset of the machines specified by the profiling request, ignore the profiling request.

19. The apparatus of claim 18, wherein the specified type of metric comprises at least one of:

a central processing unit (CPU) usage of the machine;

a memory usage of the machine;

a disk usage of the machine; and a network usage of the machine.

20. A system, comprising:

one or more processors;

a controller module comprising a non-transitory computer-readable medium storing instructions that, when executed, cause the system to publish, to a command channel, a command message that comprises a profiling request, wherein the profiling request specifies a subset of a plurality of machines, and wherein the profiling request specifies at least a type of profiler to invoke from a plurality of profilers installed on the plurality of machines;

an application module comprising a non-transitory computer-readable medium storing instructions that, when executed, cause the system to:

execute one or more instances of a software application on the plurality of machines;

at each machine that receives the command message, responsive to determining that the machine is included in the subset of the machines specified by the profiling request, respond to the profiling request by:

activating a profiler from the plurality of profilers, wherein the activated profiler corresponds to the specified type of profiler for an instance of the application that is executing on the machine at the beginning of a specified duration of time; and a data processing module comprising a non-transitory computer-readable medium storing instructions that, when executed, cause the system to:

receive, via a data channel, one or more data messages from the subset of the machines, wherein the data messages comprise data gathered by the subset of the machines in response to receiving the command message;

deactivate the profiler at the end of the specified duration of time;

evaluate the performance of the software application by aggregating and processing the data messages; and responsive to detecting an anomaly in the performance, revert the one or more instances of the application at the plurality of machines.

* * * * *